United States Patent
Yamamoto et al.

(10) Patent No.: US 7,209,832 B2
(45) Date of Patent: Apr. 24, 2007

(54) LANE RECOGNITION IMAGE PROCESSING APPARATUS

(75) Inventors: Takayuki Yamamoto, Tokyo (JP); Yoshiyuki Fujii, Tokyo (JP); Hisashi Ishikura, Tokyo (JP); Akinobu Sugiyama, Tokyo (JP); Kenichi Fujie, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 77 days.

(21) Appl. No.: 11/003,468

(22) Filed: Dec. 6, 2004

(65) Prior Publication Data

US 2006/0015252 A1    Jan. 19, 2006

(30) Foreign Application Priority Data

Jul. 15, 2004    (JP)    ............................ 2004-208738

(51) Int. Cl.
*G06K 9/00*    (2006.01)
(52) U.S. Cl. ...................... 701/301; 382/103; 382/260; 382/291
(58) Field of Classification Search ................ 701/301, 701/96, 211, 300, 117; 382/260, 103, 268, 382/154, 263, 264, 266, 291, 104, 199, 168, 382/22; 340/907, 919, 435, 436, 937, 903, 340/933; 348/148, 113, 118; 706/22, 20
See application file for complete search history.

(56) References Cited

U.S. PATENT DOCUMENTS

| | | | | |
|---|---|---|---|---|
| 5,555,312 A | * | 9/1996 | Shima et al. ............... | 382/104 |
| 5,761,326 A | * | 6/1998 | Brady et al. ................ | 382/103 |
| 5,790,403 A | * | 8/1998 | Nakayama ................... | 701/28 |
| 5,835,614 A | * | 11/1998 | Aoyama et al. ............ | 382/104 |
| 6,191,704 B1 | * | 2/2001 | Takenaga et al. ........... | 340/903 |
| 6,212,287 B1 | * | 4/2001 | Olivieri et al. ............. | 382/104 |
| 6,845,172 B2 | * | 1/2005 | Furusho ...................... | 382/104 |
| 2004/0057600 A1 | * | 3/2004 | Niwa .......................... | 382/103 |
| 2004/0201672 A1 | * | 10/2004 | Varadarajan et al. ........ | 348/148 |
| 2005/0147319 A1 | * | 7/2005 | Deshpande et al. ......... | 382/268 |

FOREIGN PATENT DOCUMENTS

| | | | |
|---|---|---|---|
| JP | 07057200 A | * | 3/1995 |
| JP | 10-320549 A | | 12/1998 |

\* cited by examiner

*Primary Examiner*—Tuan C To
(74) *Attorney, Agent, or Firm*—Sughrue Mion, PLLC

(57) ABSTRACT

A lane recognition image processing apparatus can improve lane marking recognition performance by preventing false detection by addition of a condition without changing the basic principle of an one-dimensional image filter. A search area is set for each lane marking with respect to images stored in a image storage part through a window. A candidate point extraction part extracts candidate points of each lane marking from the search area thus set. A lane marking mathematical model equation is derived by approximating sets of extracted candidate points by a mathematical model equation. The candidate point extraction part includes a kernel size setting part, a filtering part that outputs, as a filtering result, the smaller of differences between the gray value of a pixel of interest and those of pixels forwardly and rearwardly apart a kernel size from the pixel of interest in a scanning direction, respectively, and a binarization part that binarizes the filtering result.

6 Claims, 12 Drawing Sheets

LANE RECOGNITION IMAGE PROCESSING APPARATUS

BACKGROUND OF THE INVENTION

1. Field of the Invention

The present invention relates to a lane recognition image processing apparatus which is installed on a vehicle for recognizing a lane of a road based on the sensed or picked-up image of lane markings on the road on which the vehicle is travelling, and which is applied to an advanced vehicle control system such as a lane departure warning system (LDWS) intended for use with preventive safety of the vehicle such as an automobile, a lane keeping system (LKS) serving the purpose of reducing a cognitive load on drivers, etc. More particularly, the invention relates to a technique capable of improving reliability in the result of the recognition by providing vehicle lateral or transverse position information in the lane.

2. Description of the Related Art

As a conventional lane recognition image processing apparatus, there has been known one using an image filter (for example, see a first patent document: Japanese patent application laid-open No. H10-320549 (JP, H10-320549, A)).

This type of image filter is constructed of a relatively simple circuit that can extract an area of a gray scale picture or image which is brighter than its surroundings and which is less than or equal to a predetermined width.

The processing disclosed in the above-mentioned first patent document is called a one-dimensional image filtering process in which the gray value g(h) of a pixel of interest is compared with the gray values g (h−Δh) and g (h+Δh) of pixels distant a kernel size Δh from the pixel of interest forwardly and rearwardly in a search scanning direction, and the smaller value of the differences {g (h)−g (h−Δh)} and {g (h)−g (h+Δh)} thus obtained is made to be a filter output value.

In the conventional lane recognition image processing apparatus, when the forward view of the vehicle is taken by a camera installed thereon in a direction in which the vehicle is travelling, objects on an image thus taken become linearly smaller toward a vanishing point. Therefore, when the width of the neighborhood of the pixel of interest (i.e., a kernel size Δh) to be referenced or viewed by a one-dimensional image filter is fixed, the actual width of an area extracted by the filter increases linearly in accordance with the increasing distance thereof from the camera. Accordingly, in case where a lane marking of a predetermined width on a road is detected as a physical quantity, the possibility of the presence of objects other than the lane marking becomes higher as the distance from the camera increases, so there arises a problem that reliability in the result of the recognition of a distant portion of the lane marking, which is needed to exactly grasp the shape of the road, is reduced.

In addition, when the image filter for use with the extraction of lane markings is applied to an road image that includes noise components of high intensity in a range on the road, there will be another possibility of misdetecting noise portions as lane markings. In particular, in case where a binarization threshold is controlled to decrease so as to extract degraded or thinned lane markings, or where a search area includes only high-intensity noise components but no lane marking such as in the case of discontinuous portions of an intermittent lane marking, there will be a problem that noise can be misdetected with a very high possibility.

Moreover, in the case of using a CMOS image sensor as an image sensing means, the CMOS image sensor is superior to a CCD image sensor with respect to the reduction in size and cost of peripheral circuits, but has a lower S/N ratio, so there is a higher possibility that the images taken by the CMOS image sensor contain noise. Accordingly, when the binarization threshold of the image filter is controlled as usual with respect to the images taken by the CMOS image sensor, the noise component passes through the filter, thus giving rise to a problem of decreasing lane marking recognition performance Further, in recent years, CMOS image sensors with a wide dynamic range are being developed, and intermittent high intensity parts are becoming visually recognizable. However, when an image made to have a wide dynamic range is expressed as a gray scale image of a plurality of gradations (for instance, 256 steps), the entire image becomes a low contrast, so there arises a problem that in the ordinary control of the binarization threshold, it is often difficult to extract lane markings.

Furthermore, in the conventional lane recognition image processing apparatus, lane markings are extracted by using one binarization threshold with respect to one image. Thus, in general, the contrast in the output result of the image filter is high in near regions and low in distance regions, so there is a problem that in the case of extracting lane markings by the use of a single binarization threshold, it is impossible to extract a distance lane marking though a near lane marking can be extracted.

In addition, even if the binarization threshold is simply controlled to decrease in accordance with the increasing distance, there will happen a situation where the contrast can be varied at a distant or near location due to the shades of road structures depending upon the road-surrounding environment.

Moreover, in setting a window, in order to set the position of the window at a location including a lane marking and properly limit the size of the window, it is appropriate to set a current window based on the last window position calculated from a lane marking mathematical model equation, but in a situation where the number of extracted candidate points is limited and a lane marking mathematical model equation cannot be derived (i.e., the state of lane markings being lost sight of), there exists no setting reference position, so it is necessary to set a window of a wide or large size so as to search for a lane marking from the entire screen. At this time, an extended period of time for processing is required due to a wide or large search area. Therefore, it takes time for the condition to return from a lane marking lost-sight state to a lane marking recognition state, thus posing a problem that the performance of the lane recognition image processing apparatus is reduced to a substantial extent.

Further, in lane recognition image processing, it has been proposed to extract top-hat shapes (i.e., having a constant width and a luminance higher than that of the road surface) by using a one-dimensional image filter. However, such a proposal has a problem in that with respect to images of low contrast or images of low S/N ratios taken by an image sensor of a wide dynamic range, there is a possibility of misdetecting objects other than lane markings, and that once a lane marking is lost sight of, it takes time until recognition of the lane marking is restored.

SUMMARY OF THE INVENTION

An object of the present invention is to obtain a lane recognition image processing apparatus which can be improved in lane marking recognition performance with reduced misdetection by the addition of a certain condition, by variably setting the near luminance reference position and the binarization threshold of a one-dimensional image filter in accordance with the forward distance of an object in an image.

Another object of the present invention is to obtain a lane recognition image processing apparatus in which the binarization threshold has its lower limit set in accordance with the S/N ratio of the image to be binarized so as to reduce misdetection resulting from an excessive decrease in the binarization threshold, and in which the time of restoration from the lane marking lost-sight state can be shortened by setting window-setting positions on a lane marking in a reliable manner by sequentially setting of search area setting windows from a near side to a remote or distant side so as to set the following window position based on the last extraction result, and at the same time by limiting the window size.

Bearing the above objects in mind, according to the present invention, there is provided a lane recognition image processing apparatus installed on a vehicle for recognizing a lane based on a sensed image of at least one lane marking on the surface of a road. The apparatus includes: an image sensing part for sensing a forward view of the vehicle; an image storage part for temporarily storing images obtained by the image sensing part; a window setting part for setting a search area for the at least one lane marking with respect to the images stored in the image storage part by means of a window; a candidate point extraction part for extracting candidate points for the at least one lane marking from the search area set by the window setting part; and a lane recognition part for deriving a lane marking mathematical model equation by approximating sets of candidate points extracted by the candidate point extraction part by a mathematical model equation. The candidate point extraction part includes: a kernel size setting part that sets a kernel size $\Delta h$ in accordance with a forward distance from the vehicle; a filtering part that outputs, as a filtering result, the smaller one of the values that are obtained by two equations $\{g(h)-g(h-\Delta h)\}$ and $\{g(h)-g(h+\Delta h)\}$ using the gray value $g(h)$ of a pixel of interest and the gray values $g(h-\Delta h)$, $g(h+\Delta h)$ of pixels forwardly and rearwardly apart the kernel size $\Delta h$ from the pixel of interest in a scanning direction, respectively; and a binarization part that binarizes the filtering result with a threshold.

According to the present invention, false detection or misdetection can be reduced by adding a certain condition without changing the basic principle of the top-hat one-dimensional image filter, as a result of which the lane marking recognition performance of the apparatus can be improved to a substantial extent.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1

Figure 1:
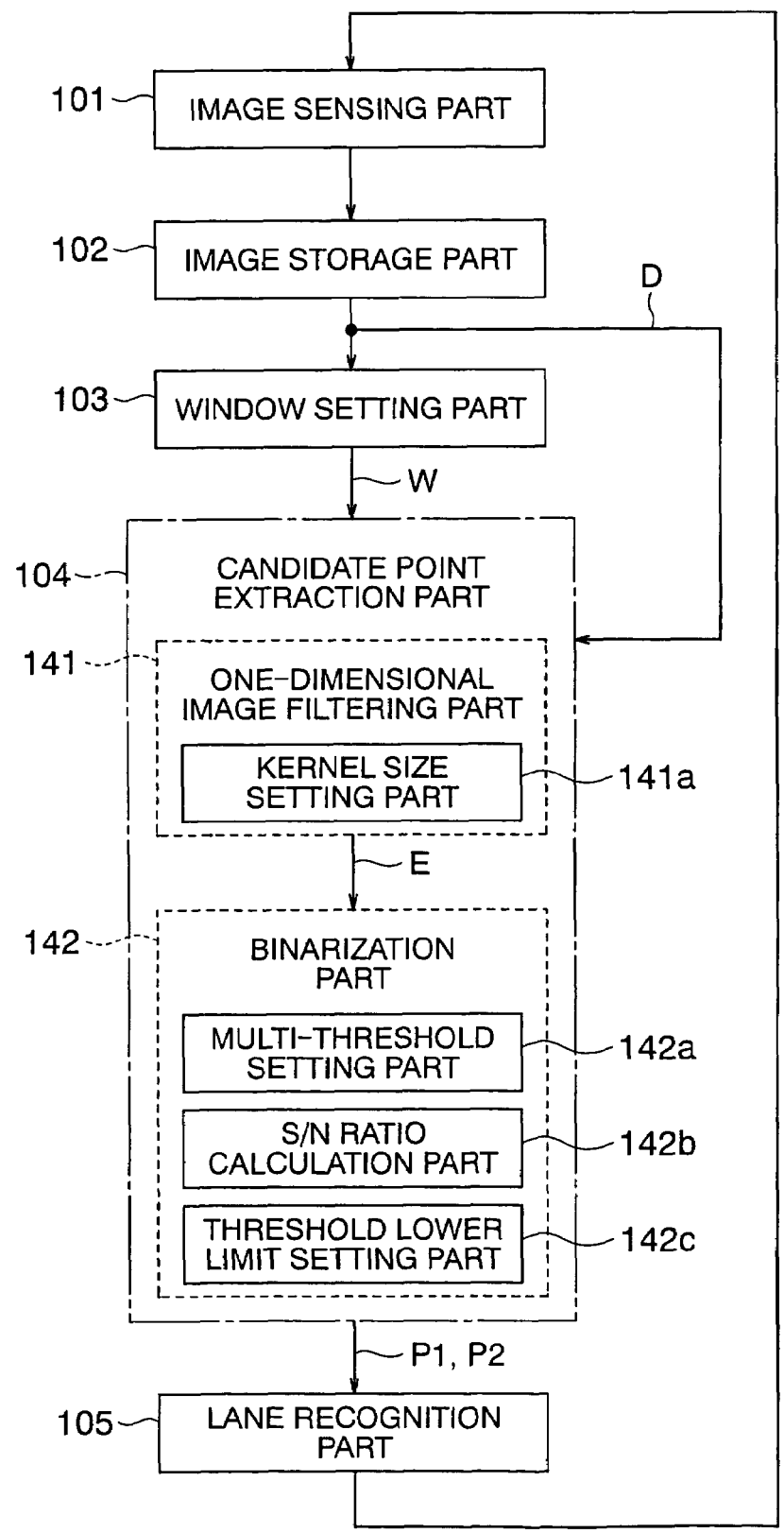
FIG. 1 is a block diagram showing the schematic construction of a lane recognition image processing apparatus according to a first embodiment of the present invention.
Figure 2:
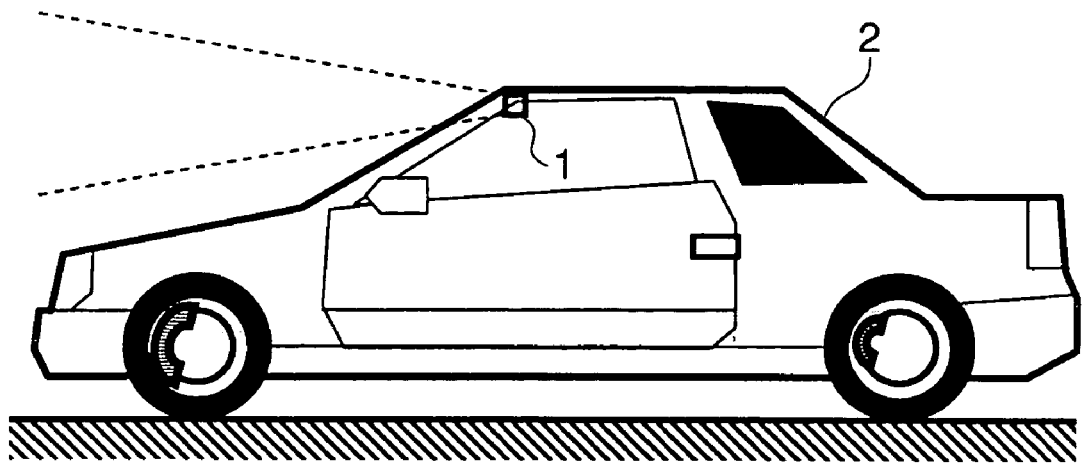
FIG. 2 is an external view showing a vehicle installing thereon the lane recognition image processing apparatus according to the first embodiment of the present invention.

FIG. 1 is a block diagram that shows a lane recognition image processing apparatus according to a first embodiment of the present invention, wherein respective components thereof are illustrated so as to correspond to processing procedures. FIG. 2 is an external view that illustrates a vehicle 2 on which a lane recognition image processing apparatus according to the first embodiment of the present invention is installed.

In FIG. 2, a camera 1, which constitutes an image sensing part, is installed on a front upper portion of the vehicle 2, and takes a forward view of the vehicle 2.

In FIG. 1, the lane recognition image processing apparatus includes an image sensing part 101 having the camera 1 and installed on the vehicle 2 (see FIG. 2) for recognizing a lane of a road based on the picked-up or sensed images of lane markings on a road surface, an image storage part 102 for temporarily storing the images obtained by the image sensing part 101, a window setting part 103 for setting a search area of the lane markings with respect to the images stored in the image storage part 102 through a window W, a candidate point extraction part 104 for extracting candidate points of a lane marking from the search area set by the window setting part 103, and a lane recognition part 105 for deriving a lane marking mathematical model equation by approximating sets of candidate points extracted by the candidate point extraction part 104 by a mathematical model equation.

The window setting part 103 includes a model equation reference part (not shown) and serves to set a reference position of the window W from the lane marking mathematical model equation.

The candidate point extraction part 104 includes a one-dimensional image filtering part 141 with a kernel size setting part 141a, a binarization part 142 for binarizing the filtering results E of the one-dimensional image filtering part 141 by means of thresholds.

The kernel size setting part 141a sets a kernel size $\Delta h$ in accordance with a forward distance from the vehicle 2.

The one-dimensional image filtering part 141 is constituted by a top-hat filter, and outputs, as a filtering result E, the smaller one of the values that are obtained by equations $\{g(h)-g(h-\Delta h)\}$ and $\{g(h)-g(h+\Delta h)\}$ using the gray value $g(h)$ of a pixel of interest and the gray values $g(h-\Delta h)$, $g(h+\Delta h)$ of distant pixels forwardly and rearwardly apart the kernel size $\Delta h$ from the pixel of interest in a scanning direction, respectively.

The binarization part 142 includes a multi-threshold setting part 142a for setting a threshold (described later) for each of search scanning lines of the one-dimensional image filtering part 141, an S/N ratio calculation part 142b for calculating an S/N ratio Rs of each filtering result E, and a threshold lower limit setting part 142c for setting a lower limit for the thresholds based on the S/N ratio Rs.

The S/N ratio calculation part 142b counts the number of filter pass ranges having their range widths less than a specified value as the number of noise ranges Mn in the filtering result E, also counts the number of filter pass ranges having their range widths more than or equal to the specified value as the number of signal ranges Ms in the filtering result E, and calculates the S/N ratio Rs based on the number of noise ranges Mn and the number of signal ranges Ms thus obtained.

The basic hardware configuration of the lane recognition image processing apparatus shown in FIG. 1 is common to that of the conventional apparatus, but includes, as its concrete or detailed processing contents, the kernel size setting part 141a, the multi-threshold setting part 142a, the S/N ratio calculation part 142b, and the threshold lower limit setting part 142c.

Now, a concrete processing operation of the lane recognition image processing apparatus according to the first embodiment of the present invention as illustrated in FIGS. 1 and 2 will be described while referring to FIG. 3 through FIG. 6.

Figure 3:
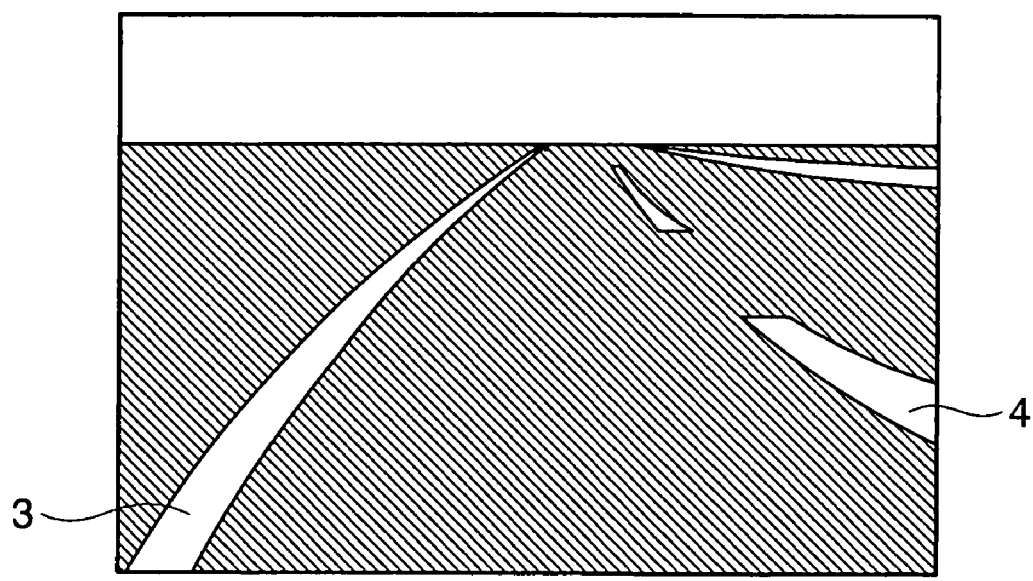
FIG. 3 is an explanatory view showing one example of a forward image output from a camera in FIG. 2.

FIG. 3 is an explanatory view that shows one example of a forward image output from the camera 1 that takes a picture of a forward road portion ahead of the vehicle 2, wherein the state of right and left lane markings 3, 4 being taken a picture is illustrated.

Figure 4:
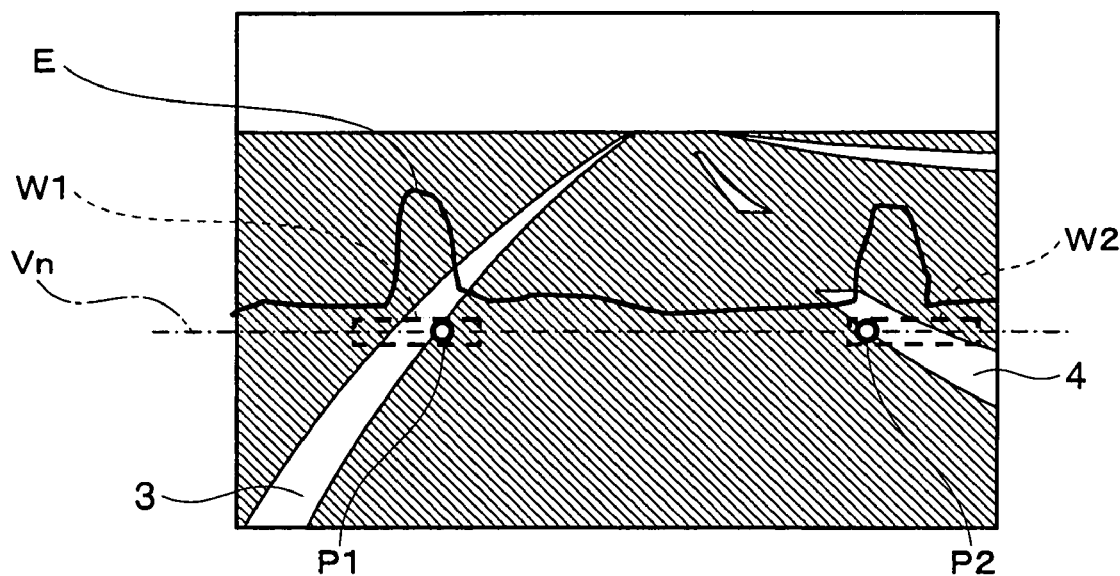
FIG. 4 is an explanatory view showing candidate points of individual lane markings in the forward image of FIG. 3.

FIG. 4 is an explanatory view that shows candidate points P1, P2 of the lane markings 3, 4, respectively, in a vehicle-forward image, wherein a filtering result E (an output of the top-hat filter) on a lane marking search line (hereinafter referred to simply as a "search line") Vn, a pair of right and left windows W1, W2 on the search line Vn, and the candidate points P1, P2 are illustrated as being associated with one another.

Figure 5:
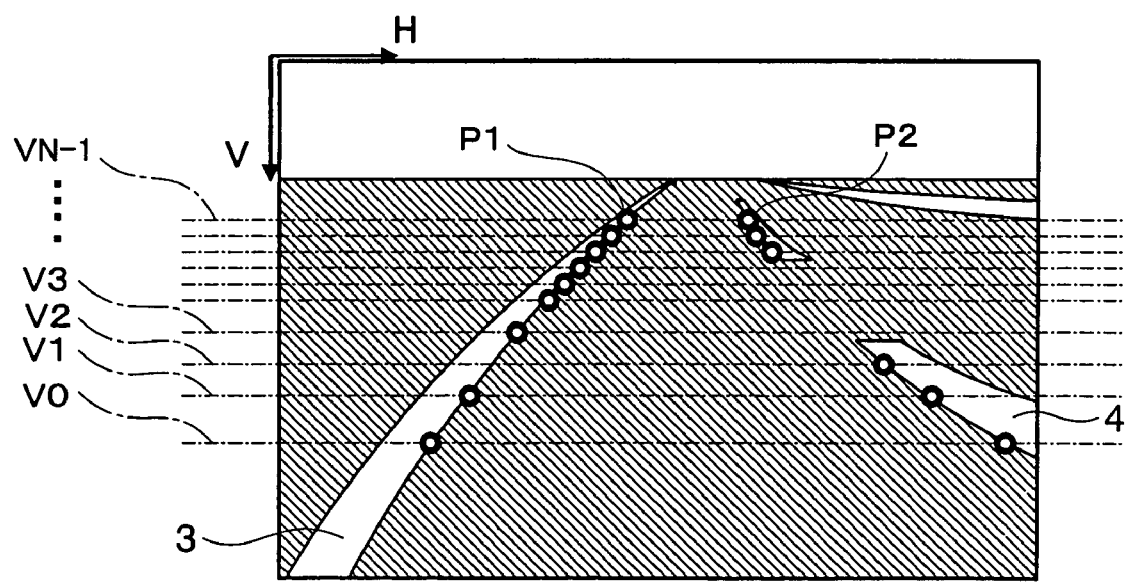
FIG. 5 is an explanatory view showing a plurality of candidate points in the forward image of FIG. 3.

FIG. 5 is an explanatory view that shows a plurality of candidate points P1, P2 in the forward image, illustrating an example in which sets of candidate points P1, P2 on a plurality of search lines Vn (n=0, 1, . . . , N−1) are detected along the lane markings 3, 4. In addition, in FIG. 5, an arrow H indicates a horizontal direction, and an arrow V indicates a vertical direction.

Figure 6:
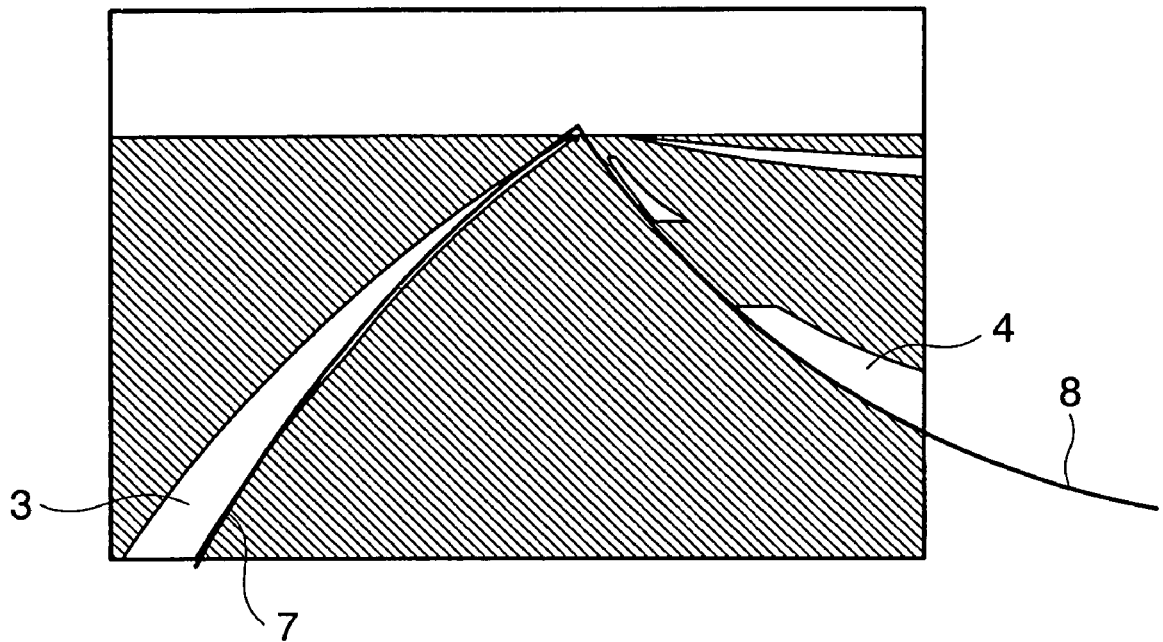
FIG. 6 is an explanatory view showing two quadratic curves (lane marking mathematical model equations) each approximating a set of candidate points in FIG. 5.

FIG. 6 is an explanatory view that shows two quadratic curves (lane marking mathematical model equations) 7, 8 approximating sets of candidate points P1, P2, respectively, in FIG. 5, wherein the quadratic curves 7, 8 approximated along the right and left lane markings 3, 4, respectively, are illustrated as being overlapped on the forward image.

First of all, the image sensing part 101 comprising the camera 1 installed on the vehicle 2 takes a forward view of the vehicle 2, and acquires a sensed or picked-up image (see FIG. 3). At this time, let us assume that the right and left lane markings 3, 4 of the lane on which the vehicle 2 is traveling are fitted in the horizontal angle of view.

Here, it is also assumed that the image sensor installed on the camera 1 comprises a CMOS image sensor.

The image storage part 102 takes the sensed or picked-up image of FIG. 3 into the memory.

Subsequently, the window setting part 103 sets a pair of horizontal scanning ranges to search for the right and left candidate points P1, P2 on a search line Vn (N=0, 1, . . . , N−1) constituting part of the search scanning lines as shown in FIG. 4 by means of the right and left windows W1, W2 (see broken line frames or boxes).

The right and left windows W1, W2 are set with the positions, which were calculated by the lane marking mathematical model equations in the last image processing, being taken as setting reference positions.

In addition, the size of each of the windows W1, W2 is set according to the maximum amount of movement of the lane markings 3, 4 generated in a time difference between the last image and the current image in the images that are subject to the image processing. That is, the longer the period of image processing, the greater do the sizes of the windows W1, W2 become.

Next, the candidate point extraction part 104 scans the windows W1, W2 (see FIG. 4) in the horizontal direction, performs filter processing by means of the one-dimensional image filtering part 141 with respect to an original image luminance distribution D read from the image storage part (memory) 102, produces a filtering result E, and inputs it into the binarization part 142.

At this time, by making reference to the gray value $g(h)$ of a pixel of interest and the gray values $g(h-\Delta h)$, $g(h+\Delta h)$ of distant pixels forwardly and rearwardly apart the kernel size $\Delta h$ from the pixel of interest in a scanning direction, respectively, the one-dimensional image filtering part (top-hat filter) 141 outputs, as a filtering result E, the smaller one of a difference $\{g(h)-g(h-\Delta h)\}$ between the gray value of the pixel of interest and that of the forward pixel and a difference {g(h)−g(h+Δh)} between the gray value of the pixel of interest and that of the rearward pixel.

Moreover, the kernel size setting part 141a sets the kernel size Δh in accordance with the forward distance from the vehicle.

The binarization part 142 binarizes the filtering result E thus obtained by the one-dimensional image filtering part 141 with the threshold, detects the candidate points P1, P2 and inputs them to the lane recognition part 105.

The above-mentioned series of processes are carried out with respect to N search lines V0 through VN−1 (see FIG. 5), so that a corresponding number of sets of candidate points P1, P2 along the lane markings 3, 4 are acquired.

Finally, the lane recognition part 105 acquires lane marking mathematical model equations 7, 8 (see FIG. 6) representative of the pertinent lane by approximating sets of the candidate points P1, P2 of the lane markings 3, 4 by means of appropriate mathematical model equations (e.g., quadratic equations).

Thereafter, the processing operation of the lane recognition image processing apparatus shown in FIG. 1 is terminated.

Next, the detailed processing operation of the one-dimensional image filtering part 141 will be described while referring to FIG. 7 through FIG. 10.

Here, as stated before, a one-dimensional top-hat filter (hereinafter abbreviated as "T-H filter") is used as the one-dimensional image filtering part 141.

Figure 7:
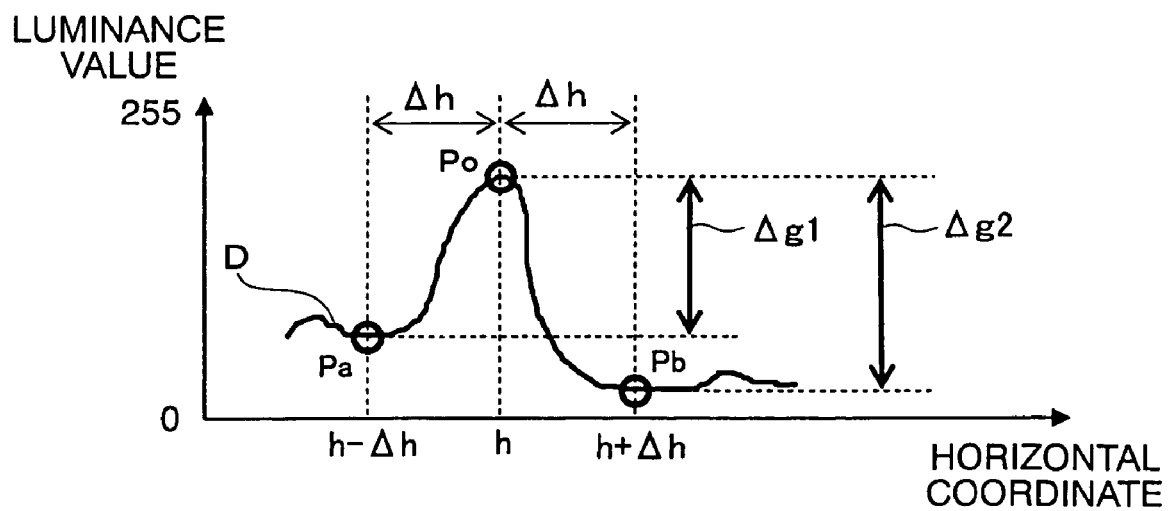
FIG. 7 is an explanatory view showing the result of a filtering process carried out on an original image luminance distribution according to the first embodiment of the present invention.

FIG. 7 is an explanatory view that shows the filtering result E (T-H filter output) of the original image luminance distribution D, wherein the axis of abscissa represents horizontal coordinates and the axis of ordinate represents intensity or luminance values (0–255).

In FIG. 7, there are illustrated luminance differences Δg1, Δg2 between a point Po of interest and forward and rearward reference points Pa, Pb apart the kernel size Δh therefrom, respectively, on the original image luminance distribution D.

Here, assuming that the individual luminance values of the point Po of interest and the reference points Pa, Pb are gPo, gPa and gPb, the respective luminance differences Δg1, Δg2 are respectively represented as follows.

$$\Delta g1 = gPo - gPa$$

$$\Delta g2 = gPo - gPb$$

The luminance value gPo of the point Po of interest corresponds to the gray value g(h) of a pixel of interest, and the luminance values gPa, gPb of the reference points Pa, Pb correspond to the gray values g(h−Δh), g(h+Δh) of the distant pixels forwardly and rearwardly apart the kernel size Δh from the pixel of interest in the sear scanning direction.

Figure 8:
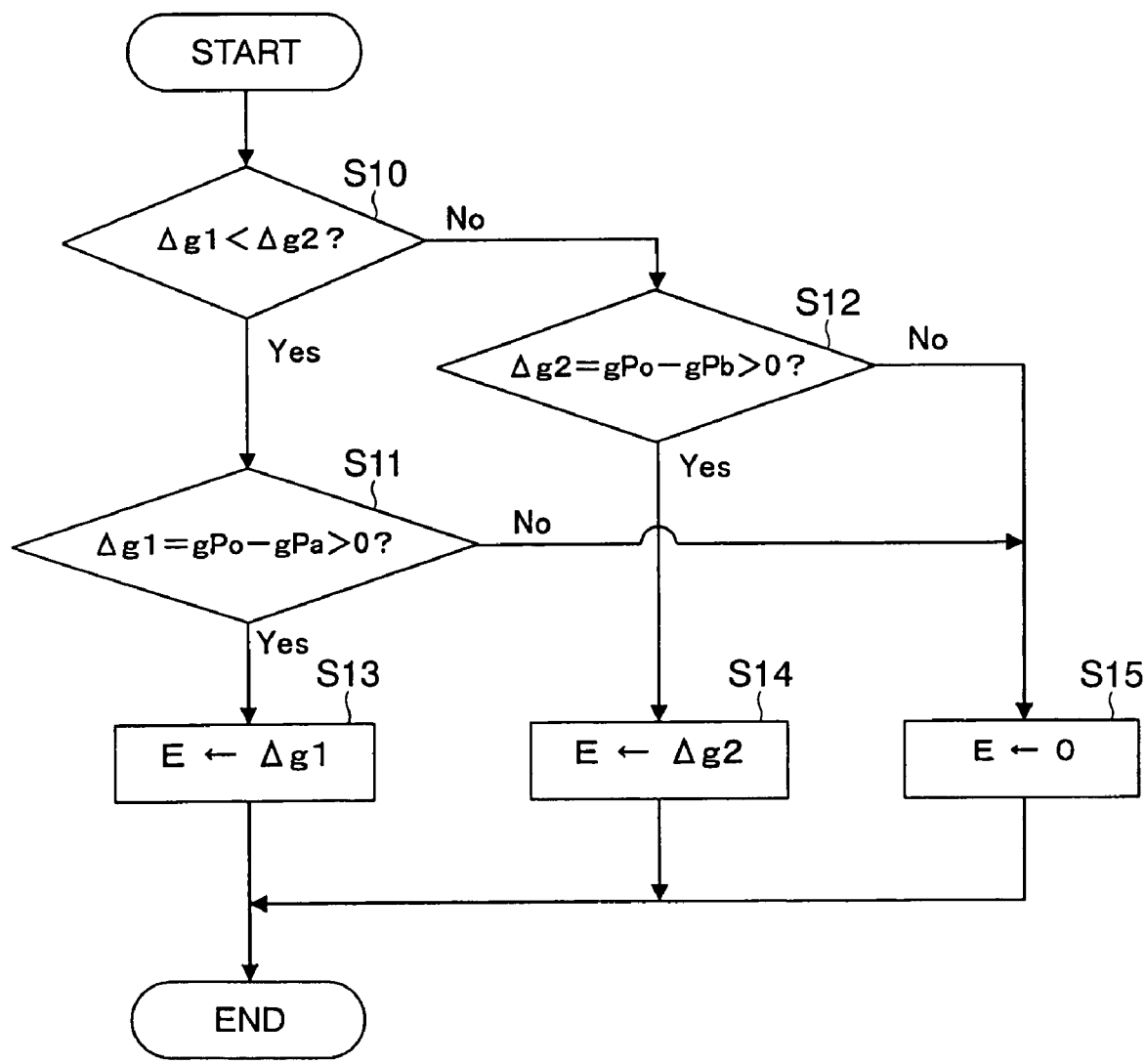
FIG. 8 is a flow chart showing filtering processing according to the first embodiment of the present invention.

FIG. 8 is a flow chart that shows the T-H filter processing of the one-dimensional image filtering part 141.

Figure 9:
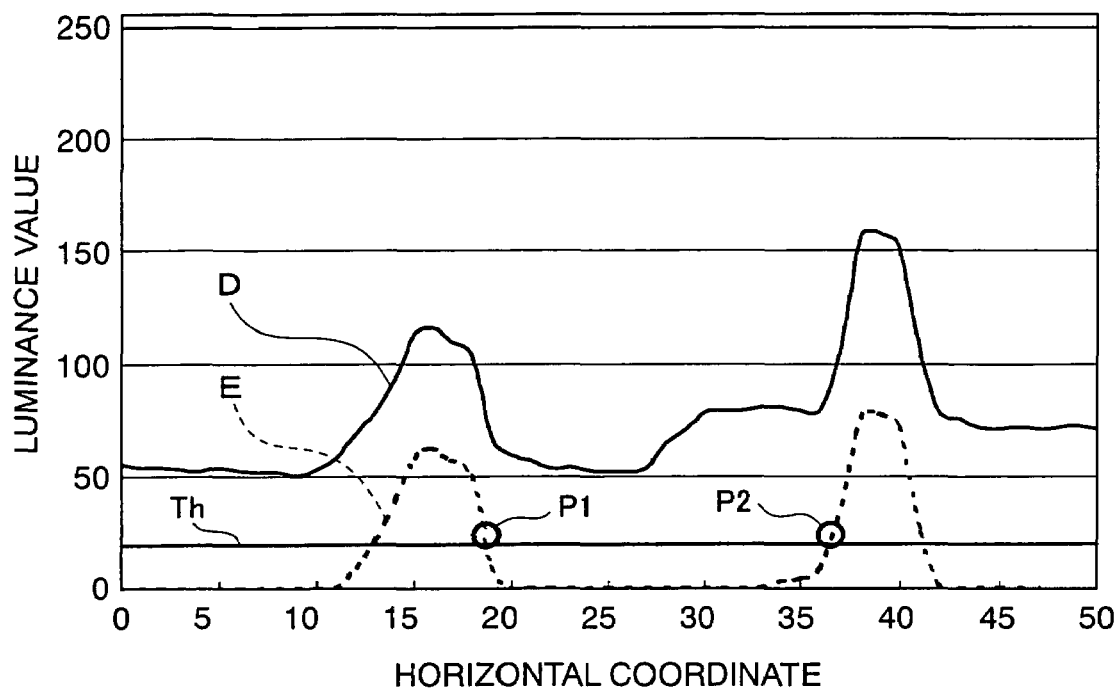
FIG. 9 is an explanatory view showing a candidate point detection process carried out by a binarization part according to the first embodiment of the present invention.

FIG. 9 is an explanatory view that shows a process of detecting the candidate points P1, P2, illustrating the state of a filtering result E (T-H filter output result) being binarized based on the threshold.

Figure 10:
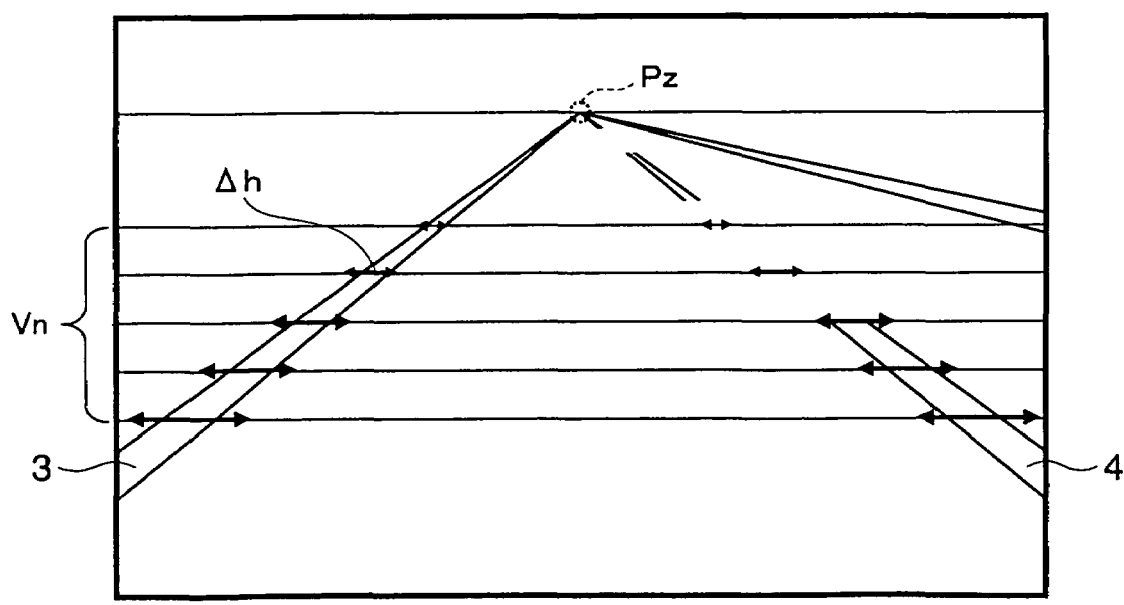
FIG. 10 is an explanatory view showing the processing of a kernel size setting part according to the first embodiment of the present invention.

FIG. 10 is an explanatory view that shows the processing of the kernel size setting part 141a, illustrating the state of the T-H filtering kernel size Δh being variably set in accordance with the forward distance.

First of all, the one-dimensional image filtering part 141 sets the point Po of interest and the reference points Pa, Pb with respect to the original image luminance distribution D that represents brightness by 256 steps (luminance values 0–255), as shown in FIG. 7.

Here, the distance between the point Po of interest and the reference point Pa and the distance between the point Po of interest and the reference point Pb are respectively called the kernel size Δh, which is set in accordance with the forward distance by the kernel size setting part 141a, as shown in FIG. 10. The width of a filter pass range (to be described later) is set by the kernel size Δh.

Specifically, the kernel size setting part 141a individually sets the kernel size Δh for each search line Vn (i.e., in accordance with the forward distance), as shown in FIG. 10.

Accordingly, the kernel size Δh is set to be constant regardless of the forward distance when viewed from above.

Such a setting process for the kernel size Δh makes use of the fact that a sensed object is becoming linearly smaller toward a vanishing point Pz. Accordingly, if the nearest kernel size Δh is set to a width corresponding to the width of the lane markings 3, 4, the kernel size Δh on each search line Vn can be sequentially calculated by a linear interpolation in accordance with the forward distance.

First of all, in the one-dimensional T-H filtering process as shown in FIG. 8, the luminance difference Δg1 between the point Po of interest and the reference point Pa and the luminance difference Δg2 between the point Po of interest and the reference point Pb, being set in a manner as shown in FIG. 7, are compared with each other, so that it is determined whether the relation of Δg1<Δg2 is satisfied (step S10).

When determined as Δg1<Δg2 in step S10 (i.e., Yes), it is subsequently determined whether the luminance difference Δg1 (=gPo−gPa) is a positive value (step S11).

On the other hand, when determined as Δg1≧Δg2 in step S10 (i.e., No), it is subsequently determined whether the luminance difference Δg2 (=gPo−gPb) is a positive value (step S12).

When determined as Δg1>0 in step S11 (i.e., Yes), the luminance difference Δg1 is output as a filtering result E (T-H filter output value) (step S13) and the processing routine of FIG. 8 is terminated.

When determined as Δg2>0 in step S12 (i.e., Yes), the luminance difference Δg2 is output as a filtering result E (step S14), and the processing routine of FIG. 8 is terminated.

On the other hand, when determined as Δg1≦0 in step S11 (i.e., No), or determined as Δg2≦0 in step S12 (i.e., No), the filtering result E is set to "0" (step S15), and the processing routine of FIG. 8 is terminated.

Thus, the smaller value of the luminance differences Δg1, Δg2 is selected and output as a filtering result E.

For instance, in the case of the original image luminance distribution D shown in FIG. 7, the relation of the luminance differences is Δg1<Δg2, so the control flow proceeds from step S10 to step S11, and if Δg1>0, the control flow proceeds to step S13 where the luminance difference Δg1 becomes a filtering result E (T-H filter output value).

Here, note that if Δg1≦0, the control flow proceeds to step S15 where the filtering result E (T-H filter output value) becomes "0".

Further, when the control flow has proceeded from step S10 to step S12 (the luminance difference Δg2 has been selected), it is determined whether the luminance difference Δg2 is positive or negative, and the filtering result E (T-H filter output value) is determined in step S14 or step S15.

The above-mentioned series of processes in steps S10 through S15 are executed with respect to a point Po of interest within a window for each search line Vn so that, as shown in FIG. 9, the filtering result E (see broken line) with respect to the original image luminance distribution D is obtained.

In FIG. 9, however, to simplify the explanation, only the filtering result of a single line is illustrated.

Hereinafter, the binarization part 142 binarizes the filtering result E so as to obtain the candidate points P1, P2 by using a binarization (T-H filter) threshold Th (hereinafter referred to simply as a "threshold").

The threshold Th is set with respect to the filtering result E, as shown in FIG. 9, and serves to contribute to the detection of the right and left candidate points P1, P2.

Here, note that though both of the positions of the right and left candidate points P1, P2 with respect to the areas extracted by the threshold Th have been set within the corresponding lane areas, respectively, in FIG. 9, they may be set to a midpoint of the area extracted by the threshold Th.

Here, reference will be made to a process of setting the threshold Th by means of the multi-threshold setting part 142a in the binarization part 142 while referring to FIG. 11 and FIG. 12.

Figure 11:
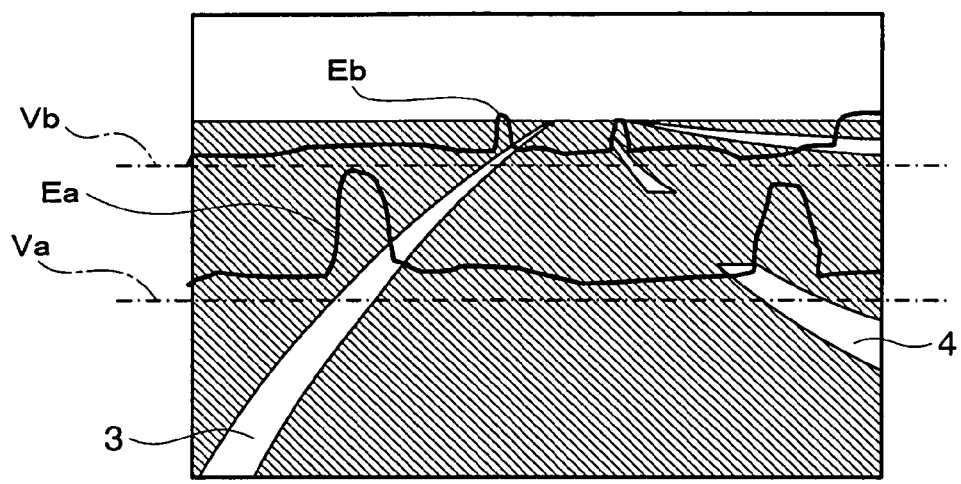
FIG. 11 is an explanatory view showing the results of near and distant filtering processes according to the first embodiment of the present invention.

FIG. 11 is an explanatory view that shows the results of near and distant filterings (T-H filter output results), illustrating the state that the contrast of the distant filtering result Eb is lower than that of the near filtering result Ea.

Figure 12:
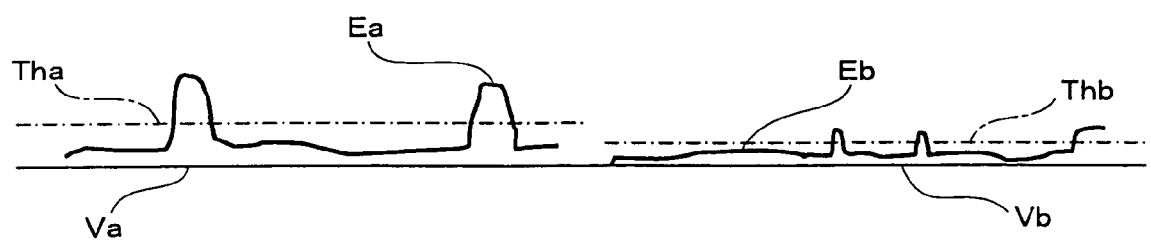
FIG. 12 is an explanatory view showing thresholds set with respect to the results of near and distant filtering processes according to the first embodiment of the present invention.

FIG. 12 is an explanatory view that shows a threshold set with respect to the results of the near and distant filterings, illustrating the state that both of the near and distant candidate points can be detected by applying independent thresholds Tha, Thb to the results of the near and distant filterings Ea, Eb, respectively.

The multi-threshold setting part 142a in the binarization part 142 individually sets a threshold Th for each search line Vn, similar to the setting of the kernel size Δh (see FIG. 10).

For instance, it is assumed that the results of the near and distant filterings Ea, Eb are obtained on near and distant search lines Va, Vb, respectively, as shown in FIG. 11.

Here, note that when attention is focused on the near search line Va, a maximum value Ea(max) and an average value Ea(mean) for the threshold Tha are calculated from the result of the near filtering Ea, and the threshold Tha is set based on these values Ea(max), Ea(mean) as shown in the following expression (1).

$$Tha = Ea(\max) - Ea(\text{mean}) \quad (1)$$

Also, the threshold Thb for the distant search line Vb is set in the same manner. Hereinafter, an independent threshold Th for each search line Vn is set in the same way.

As a consequence, a proper threshold Thb (<Tha) is set for the result of the distant filtering Eb, as shown in FIG. 12, whose contrast is lower than that in the result of the near filtering Ea.

Thus, by setting the luminance reference positions (reference points Pa, Pb) and the threshold Th for the filtering result E independently on each search line Vn (i.e., in accordance with the forward distance) based on the kernel size Δh, an area with its width more than or equal to a predetermined width can be passed through the filter as a signal range irrespective of the forward distance, so it is possible to achieve image filter processing effective to extract the lane markings 3, 4 each having a predetermined width.

Accordingly, false detection can be reduced to improve recognition performance for the lane markings 3, 4 merely by adding the above-mentioned conditions without changing the basic principle of the one-dimensional image (top-hat) filter processing part 141.

In particular, by reducing false detection in the result of distant filtering Eb that becomes low contrast (see FIG. 11 and FIG. 12), it is possible to improve reliability in the distant lane marking recognition result needed to grasp the road shape.

That is, in the multi-threshold setting part 142a, by setting a threshold Th for each search line (search scanning line) Vn of the one-dimensional image filtering part 141, and by setting a proper distant threshold Thb (<Tha) with respect to a distant image whose contrast is lower than that of a near image, as shown in FIG. 12, the distant lane marking recognition performance can be improved.

By setting the threshold Th for each search line Vn, it is possible to cope with a situation where the near contrast (i.e., the contrast of a near location) is conversely lowered due to the shadow of a road structure, etc.

In addition, by sequentially setting a window W for each search line Vn (from a near side toward a remote or distant side) with the use of the lane marking mathematical model equation, and by setting the following window position based on the last extraction result, it is possible to set the position of the window W on each of the lane markings 3, 4 in a reliable manner. Moreover, by limiting the size of each window W, the restoration time from the lost-sight state of the lane markings 3, 4 can be shortened.

Further, since the dynamic range of the processing operation in the one-dimensional image filtering part 141 and the binarization part 142 is wide, the binarization threshold can be properly set with respect to an image which is taken by the use of a CMOS image sensor of a wide dynamic range and in which the contrast of the entire image is low.

Now, reference will be made to an arithmetic process of calculating the S/N ratio Rs by means of the S/N ratio calculation part 142b while referring to FIG. 13.

Figure 13:
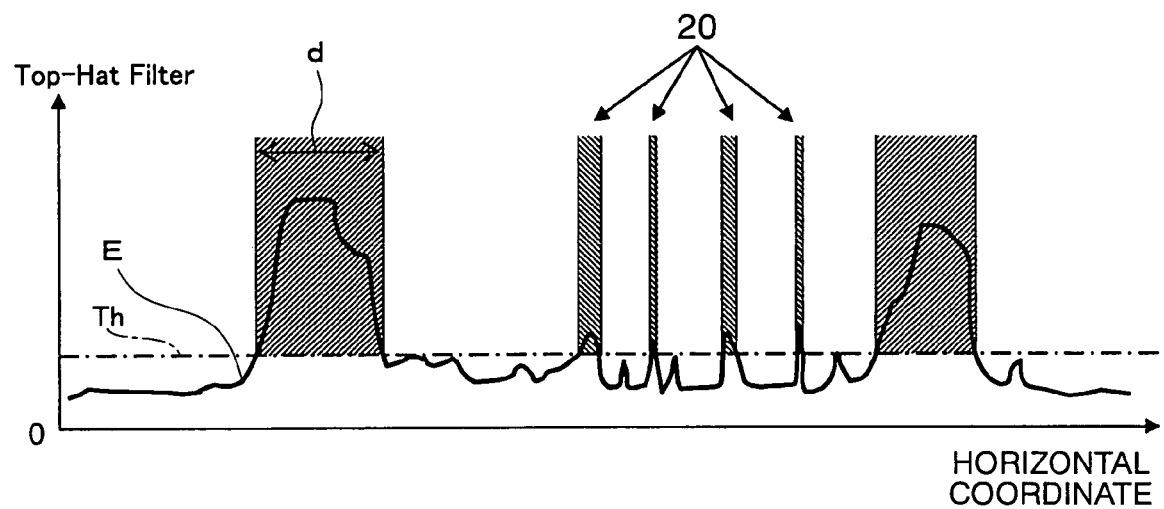
FIG. 13 is an explanatory view showing a process of determining noise ranges and signal ranges with respect to the result of a filtering process according to the first embodiment of the present invention.

FIG. 13 is an explanatory view that shows a process of determining signal ranges and noise ranges with respect to the filtering result E, wherein the axis of abscissa represents horizontal coordinates and the axis of ordinate represents the output levels of the filtering result E.

The S/N ratio calculation part 142b detects noise ranges 20 together with signal ranges, as shown in FIG. 13, calculates an S/N ratio Rs from the number of the signal ranges and the number of the noise ranges, and utilizes the S/N ratio Rs thus obtained as a setting condition for the threshold Th.

In FIG. 13, first of all, the S/N ratio calculation part 142b extracts filter pass ranges (see shaded portions) by utilizing the threshold Th with respect to the filtering result E.

Subsequently, the width d of each filter pass range is compared with a specified value, and it is determined that those which have their range width d greater than or equal to the specified value are the signal ranges, and those which have their range width less than the specified value are the noise ranges 20.

In addition, the number Ms of the signal ranges and the number Mn of the noise ranges 20 are counted, respectively, and the value calculated according to the following expression (2) by using the number of the signal ranges Ms and the number of the noise ranges Mn is defined as the S/N ratio Rs.

$$Rs = Ms/(Ms+Mn) \times 100[\%] \quad (2)$$

Next, reference will be made to a process of setting a lower limit of the threshold Th by means of the threshold lower limit setting part 142c.

The threshold lower limit setting part 142c sets the lower limit of the threshold Th based on the S/N ratio Rs calculated by the S/N ratio calculation part 142b. Specifically, the threshold Th is controlled so as to keep the S/N ratio Rs to be constant.

For instance, when the permissible lower limit value of the S/N ratio Rs is adjusted to 70%, thresholds Th(70%) when the S/N ratio Rs satisfies 70% or more are always stored, and a control process of adopting the latest threshold Th(70%) (stored at the last) is applied when the S/N ratio Rs has become less than 70%.

Thus, by setting the lower limit of the threshold Th based on the S/N ratio Rs of the image in the threshold lower limit setting part 142c so as to reduce false detection that would otherwise result from an excessive decrease or lowering of the threshold Th, it is possible to greatly reduce the false detection due to such an excessive lowering of the threshold Th with respect to images containing a lot of noise.

Figure 14:
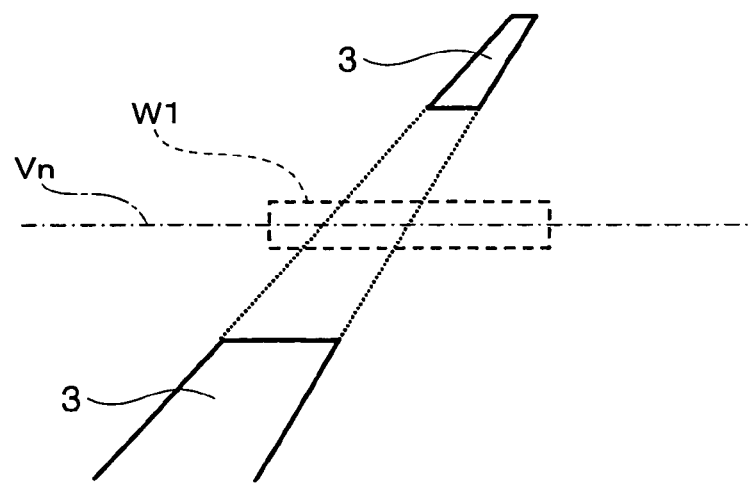
FIG. 14 is an explanatory view showing an intermittent lane marking.

Particularly, in cases where no lane marking exists in the window W1 when the vehicle is traveling on a lane with an intermittent lane marking 3, as shown in FIG. 14, false detection can be effectively reduced.

Moreover, when a CMOS image sensor is used as the image sensing part 101, the S/N ratio of an image sensed thereby decreases as compared with the case of using a CCD image sensor. However, even if the CMOS image sensor is used, it is possible to achieve substantially the same recognition performance of the lane markings 3, 4 as in the case of using the CCD image sensor by setting the lower limit of the threshold Th in accordance with the S/N ratio Rs.

Embodiment 2.

Figure 15:
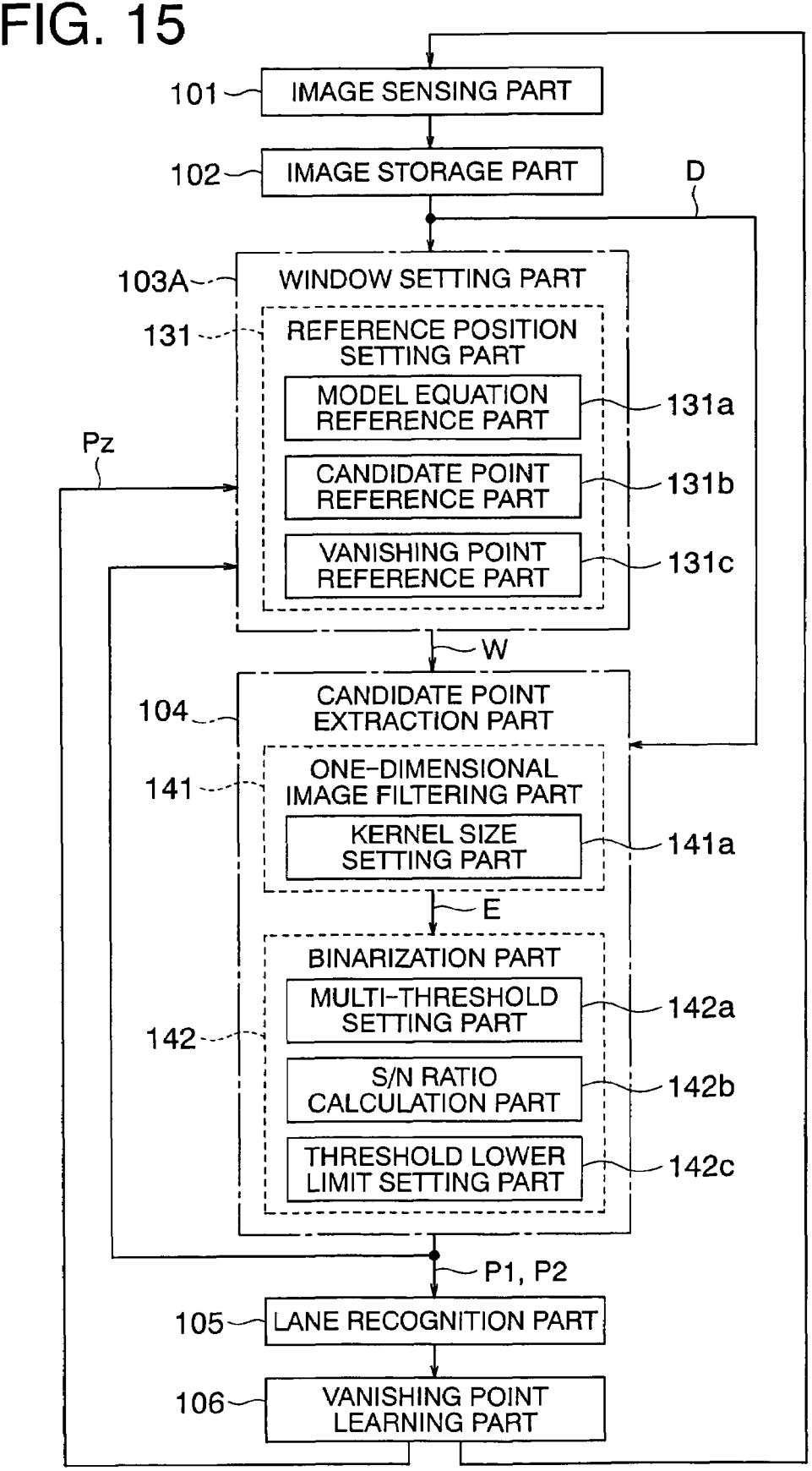
FIG. 15 is a block diagram showing the schematic construction of a lane recognition image processing apparatus according to a second embodiment of the present invention.

Although in the above-mentioned first embodiment, only the model equation reference part is used in the setting of a window, a candidate point reference part 131b and a vanishing point reference part 131c can be added to or incorporated in the reference position setting part 131 in a window setting part 103A, and a vanishing point learning part 106 can also be provided for optimally setting the window W for each search line Vn, as shown in FIG. 15.

FIG. 15 is a block diagram showing a lane recognition image processing apparatus according to a second embodiment of the present invention in a manner to correspond to processing procedures, wherein the same or corresponding parts or elements as those in the above-mentioned first embodiment (see FIG. 1) are identified by the same symbols while omitting a detailed description thereof.

In FIG. 15, a major difference from the above-mentioned first embodiment (FIG. 1) is that the reference position setting part 131 in the window setting part 103A incorporates therein not only the model equation reference part 131a but also the candidate point reference part 131b and the vanishing point reference part 131c, and at the same time, provision is made for the vanishing point learning part 106 in conjunction with the vanishing point reference part 131c.

The reference position setting part 131 includes the model equation reference part 131a, the candidate point reference part 131b, and the vanishing point reference part 131c, so that either one of the model equation reference part 131a, the candidate point reference part 131b and the vanishing point reference part 131c can be selected to set the reference positions of windows W to search for the lane markings 3, 4.

The model equation reference part 131a in the window setting part 103A serves to set the reference positions of the windows W on each search line Vn from the above-mentioned lane marking mathematical model equations.

Figure 16:
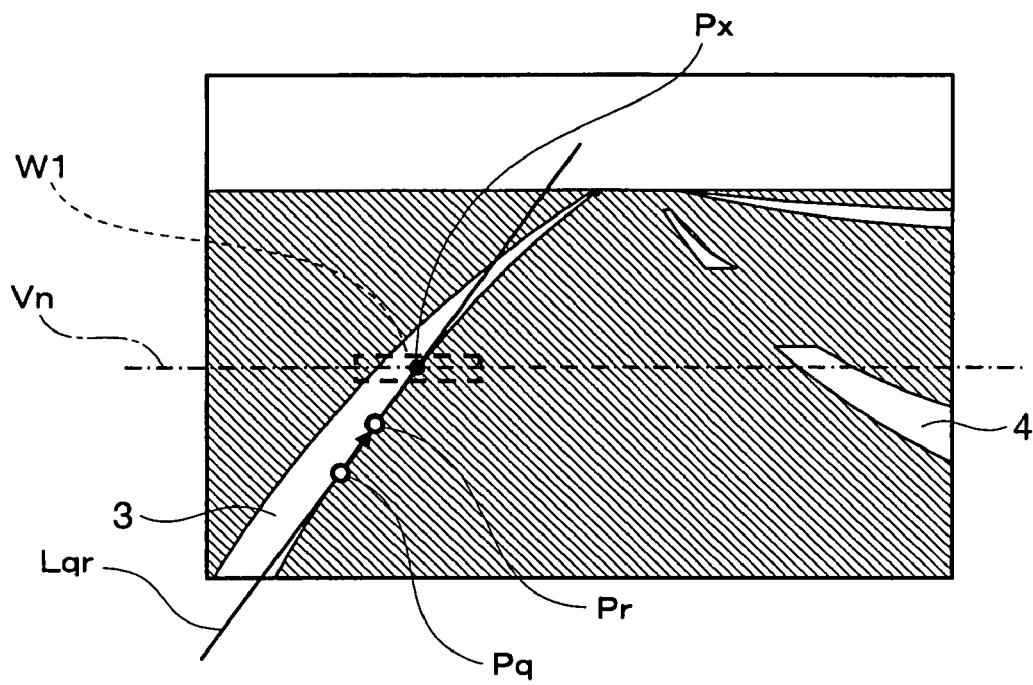
FIG. 16 is an explanatory view showing a window setting process based on two near candidate points according to the second embodiment of the present invention.

FIG. 16 is an explanatory view that shows the processing of the candidate point reference part 131b, wherein attention is expediently focused on the left lane marking 3 alone so as to set a reference position with respect to a left window W1.

In FIG. 16, in cases where there exist two or more candidate points Pq, Pr, the candidate point reference part 131b in the reference position setting part 131 sets the window W1 on the following search line Vn based on a straight line Lqr connecting between the two adjacent candidate points Pq, Pr. That is, the window W1 is set based on an intersection Px between the straight line Lqr and the search line Vn.

Figure 17:
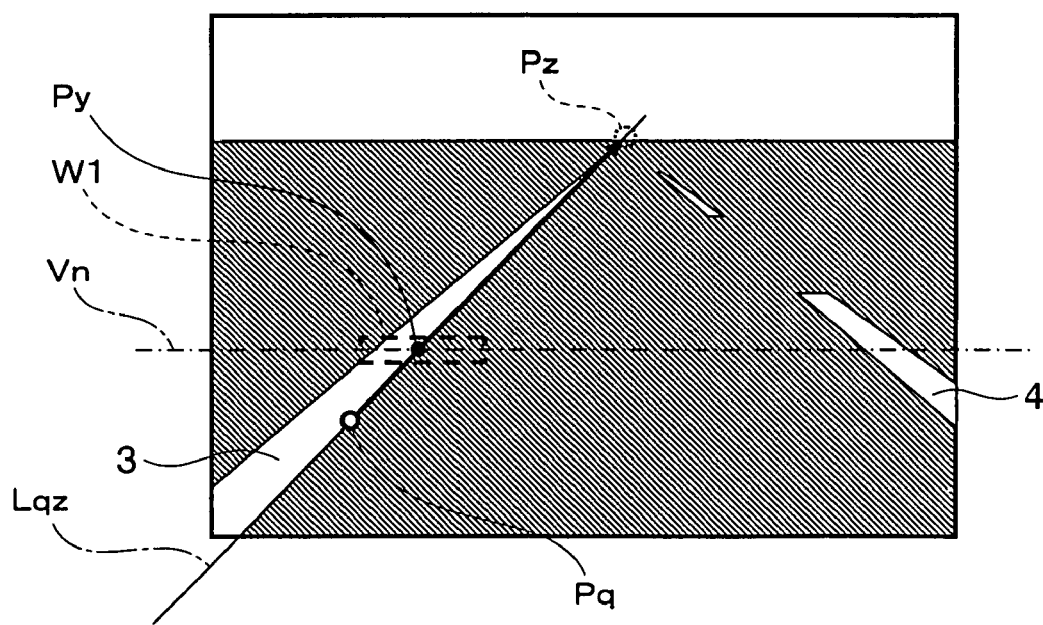
FIG. 17 is an explanatory view showing a window setting process based on a near candidate point and a vanishing point according to the second embodiment of the present invention.

FIG. 17 is an explanatory view that shows the processing of the vanishing point reference part 131c, wherein similar to the case of FIG. 16, attention is focused on the left lane marking 3 alone so as to set a reference position with respect to the left window W1.

In FIG. 17, in cases where there exists a single candidate point Pq alone, the vanishing point reference part 131c in the window setting part 103A sets the window W1 on the following search line Vn based on a straight line Lqz connecting between the near candidate point Pq and a vanishing point Pz. That is, the window W1 is set based on an intersection Py between the straight line Lqz and the search line Vn.

Figure 18:
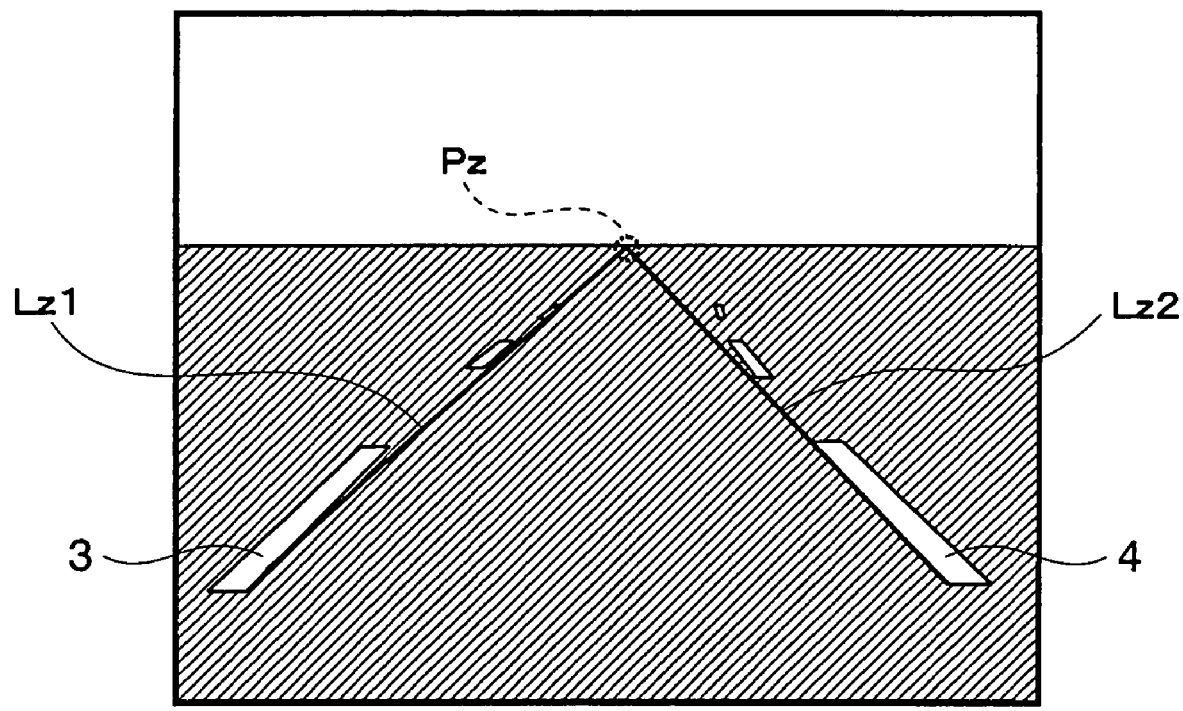
FIG. 18 is an explanatory view showing a vanishing point learning process according to the second embodiment of the present invention.

FIG. 18 is an explanatory view that shows the processing of the vanishing point learning part 106, illustrating the state that the vanishing point (learning position) Pz is obtained through learning based on the right and left lane markings 3, 4.

In FIG. 18, the vanishing point learning part 106 approximates sets of right and left candidate points P1, P2 (see FIGS. 4, 5 and FIG. 9) in the vicinity of the vehicle extracted by the candidate point extraction part 104 by linear or straight lines, respectively, and learns as the vanishing point Pz an intersection between the approximate linear lines Lz1, Lz2 (corresponding to the right and left lane markings 3, 4) derived from the sets of candidate points.

Now, reference will be made to a process of setting a window W by means of the lane recognition image processing apparatus according to the second embodiment of the present invention shown in FIG. 15 while referring to a flow chart of FIG. 19 together with FIG. 16 through FIG. 18.

Figure 19:
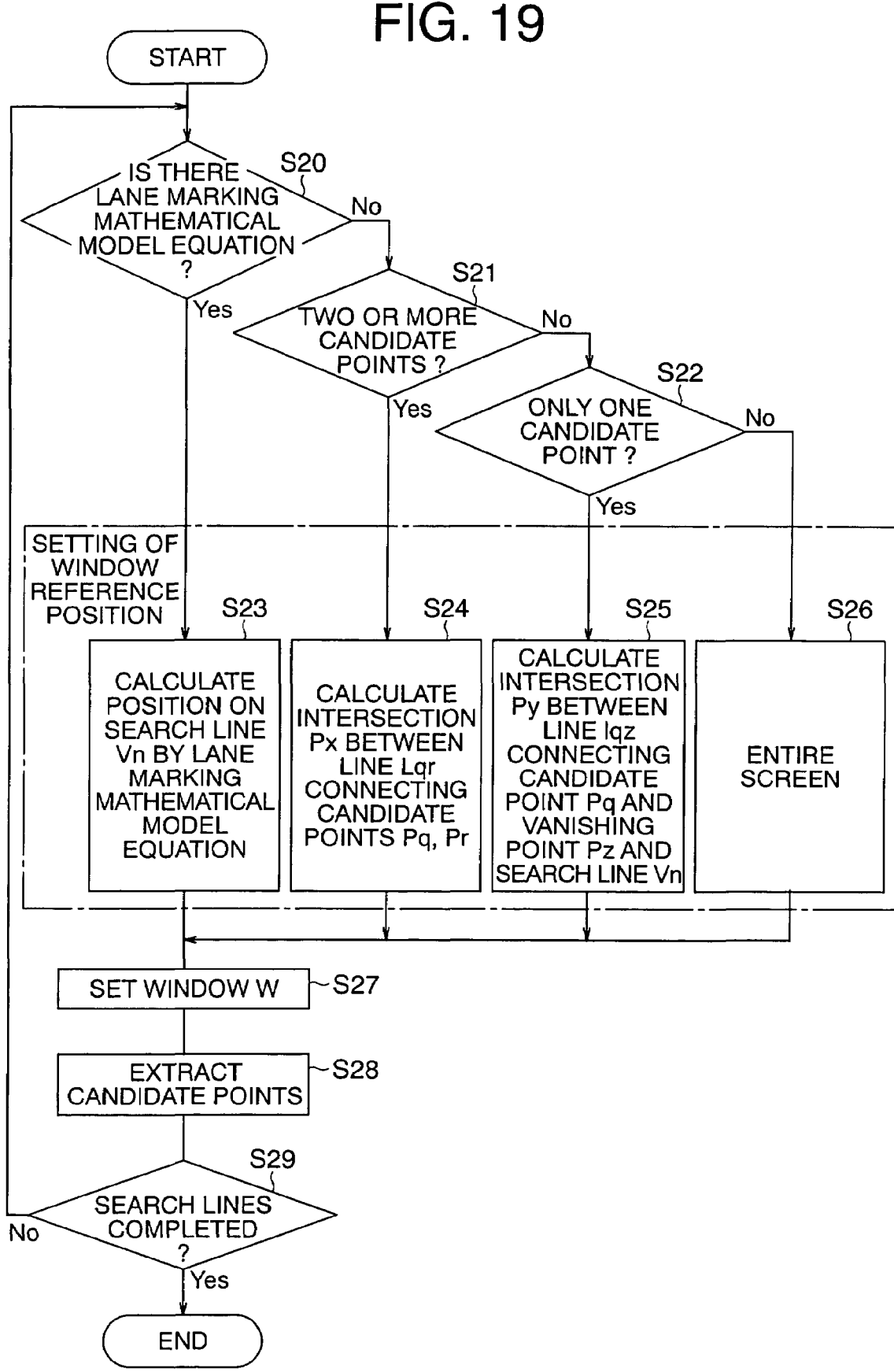
FIG. 19 is a flow chart showing window setting processing according to the second embodiment of the present invention.

In FIG. 19, steps S20 through S22 represent a determination process for selecting the reference parts 131a through 131c, respectively, and steps S23 through S26 represent a process for setting a reference position of each window W based on the results of determinations in the respective steps S20 through S22.

The window setting part 103A first determines whether there exists any lane marking mathematical model equation (step S20), and when determined that a lane marking mathematical model equation exists (i.e., Yes), it then selects the model equation reference part 131a. That is, similar to the above, the position of the line Lqr on a search line Vn is calculated from the lane marking mathematical model equation, and it is decided as the reference position of the window W (step S23).

On the other hand, when determined in step S20 that there exists no lane marking mathematical model equation (i.e., No), it is subsequently determined whether two or more candidate points have been extracted (step S21).

When determined in step S21 that two or more candidate points have been extracted (i.e., Yes), the candidate point reference part 131b is selected, so that it decides an intersection Px between the straight line Lqr connecting the candidate point Pq and the candidate point Pr and the following search line Vn as a reference position, as shown in FIG. 16 (step S24).

At this time, assuming that the lane marking 3 is searched in a direction from a near side toward a distance side, there exist the candidate point Pq initially detected and the candidate point Pr next detected.

On the other hand, when determined in step S21 that two or more candidate points have not been extracted (i.e., No), it is further determined whether a single candidate point alone has been extracted (step S22).

When determined in step S22 that a single candidate point alone has been extracted (i.e., Yes), the vanishing point reference part 131c is selected, so that it decides as a reference position an intersection Py between a straight line Lqz connecting the near candidate point Pq and the vanishing point Pz and the following search line Vn, as shown in FIG. 17 (step S25).

In this case, too, assuming that a search is started from a near side toward a distance side, there exists the candidate point Pq initially detected.

On the other hand, when determined in step S22 that there is no candidate point at all (i.e., No), a search is made for the lane marking 3 from the entire image sensing screen (step S26).

Hereinafter, subsequent to the reference position setting steps S23 through S26, a window W1 is set for the left lane marking 3 for instance (step S27). Though not described in detail, a window W2 is similarly set for the right lane marking 4 according to the same process steps.

Then, candidate points P1, P2 are extracted by means of the windows W1, W2 set in step S27 (step S28), and it is determined whether the search line Vn being currently processed is the final line (n=N−1)(step S29).

When determined in step S29 that the current search line Vn is the final line (i.e., Yes), the processing routine of FIG. 19 is ended, whereas when determined that the current search line Vn is not the final line (i.e., No), a return is performed to step 20, from which the above-mentioned processes are repeated until the final line is reached.

Here, note that the vanishing point learning part 106 obtains the learning coordinates of the vanishing point Pz from the approximate straight lines Lz1, Lz2 of the right and left lane markings 3, 4, as shown in FIG. 18, and inputs them to the vanishing point reference part 131c, thus contributing to the reference position setting process in step S25.

For instance, if there is a state in which a sufficient number of candidate points have been extracted so as to permit the acquisition of the approximate straight lines Lz1, Lz2 (see FIG. 18) before the single candidate point Pq alone comes into existence, the vanishing point learning part 106 provides the learning coordinates of the final vanishing point Pz by low-pass filtering the coordinates of an intersection between the approximate straight lines Lz1, Lz2.

On the other hand, if there is no state in which the approximate straight lines Lz1, Lz2 have been obtained before the single candidate point Pq alone comes into existence, a vanishing point default position (i.e., calculated from the mounting height and the angle of elevation of the camera 1 (see FIG. 2)) in the image sensing screen is substituted as the vanishing point Pz.

Accordingly, in either case, the learning coordinates of the vanishing point Pz can be obtained in a reliable manner, and in step S25, the intersection Py (see FIG. 17) between the straight line Lqz connecting the vanishing point Pz and the initially detected candidate point Pq and the following search line Vn can be set as the reference position.

Further, the result of the process in the candidate point extraction step S28 among a series of processes shown in FIG. 19 is reflected in each of the determination steps S21 and S22. That is, if a search is executed normally, the number of candidate points extracted in step S28 increases as the search proceeds from the near side toward the distant side. Accordingly, if focusing on the step S22 for instance, the result thereof will be changed from the state of branching to step S26 into the state of branching to step S25.

Similarly, when focusing on step S21, the result thereof will be changed from the state of branching to step S25 into the state of branching to step S24.

However, when the curvature of the road is relatively large at the time of using the vanishing point Pz and the candidate point Pq in step S25, the shape of the straight line Lqz connecting the vanishing point Pz and the candidate point Pq and the shape of the lane marking 3 become mismatch or disagreement with each other as the distance from the candidate point Pq increases.

To cope with such a problem, the following measure can be taken. That is, assuming that the horizontal angle of visibility of the camera 1 is 33 degrees and the mounting height thereof is 1.2 meter, for example, a range of 20 meter or less forward from the camera 1 can be considered as a straight line, and the execution condition for the process in step S25 (i.e., the intersection Py between the straight line Lqz connecting the vanishing point Pz and the candidate point Pq and the search line Vn is taken as a search reference position) is limited to within a range of 20 meter or less forward from the camera 1.

Thus, in the case of the presence of two or more candidate points, by setting as a reference position the intersection Px between the straight line Lqr connecting the two candidate points Pq, Pr and the following search line Vn, it is possible to set windows W on the lane markings 3, 4, respectively, even in the state where the last lane marking mathematical model equations (window setting reference) are not present (i.e., the lost-sight state of the lane markings 3, 4).

At this time, if the two most distant possible candidate points are sequentially extracted as targets in the case of extracting candidate points from a near side toward a distant side in a sequential manner, the ability to follow the lane markings 3, 4 can be improved with respect to a straight road as well as a road with a curvature.

In addition, the process of setting proper windows serves to prevent the windows W from being set wider than necessary, so the processing time can be shortened, and restoration from a lost-sight state of the lane markings 3, 4 to a recognition state thereof can be carried out in a short time.

Moreover, by approximating sets of candidate points P1, P2 by straight lines, and by learning the vanishing point Pz from the intersection between the straight lines Lz1, Lz2 that proximate the right and left lane markings 3, 4, respectively, it is possible to set windows W on the lane markings 3, 4 on the basis of the intersection Py of the straight line Pqz connecting the candidate point Pq and the vanishing point Pz and the following search line Vn, even if the lane markings are lost sight of with the presence of the single candidate point alone.

In particular, even if the vehicle 2 (see FIG. 2) moves sideways on a straight road, the vanishing point Pz does not move as long as the vehicle 2 is traveling in parallel to the road, as a consequence of which the windows W can be set on the lane markings 3, 4 in a reliable manner.

Further, by sequentially setting a window W for each search line Vn (from a near side toward a distant side), and by setting the following window position based on the last extraction result, it is possible to set the position of the window W on each of the lane markings 3, 4 in a reliable manner. Furthermore, by limiting the size of each window W, the restoration time from the lost-sight state of the lane markings 3, 4 can be shortened.

While the invention has been described in terms of preferred embodiments, those skilled in the art will recognize that the invention can be practiced with modifications within the spirit and scope of the appended claims.

What is claimed is:

1. A lane recognition image processing apparatus installed on a vehicle for recognizing a lane based on a sensed image of at least one lane marking on the surface of a road, said apparatus comprising:
    an image sensing part sensing a forward view of said vehicle;
    an image storage part temporarily storing images obtained by said image sensing part;
    a window setting part setting a search area for said at least one lane marking with respect to the images stored in said image storage part by means of a window;
    a candidate point extraction part extracting candidate points for said at least one lane marking from said search area set by said window setting part; and
    a lane recognition part deriving a lane marking mathematical model equation by approximating sets of candidate points extracted by said candidate point extraction part by a mathematical model equation,
    wherein said candidate point extraction part comprises:
    a kernel size setting part setting a kernel size $\Delta h$ in accordance with a forward distance from said vehicle;
    a one-dimensional image filtering part outputting, as a filtering result, the smaller one of the values that are obtained by two equations $\{g(h)-g(h-\Delta h)\}$ and $\{g(h)-g(h+\Delta h)\}$ using the gray value $g(h)$ of a pixel of interest and the gray values $g(h-\Delta h)$, $g(h+\Delta h)$ of pixels forwardly and rearwardly apart said kernel size $\Delta h$ from said pixel of interest in a scanning direction, respectively; and
    a binarization part that binarizes said filtering result with a threshold.

2. The lane recognition image processing apparatus as set forth in claim 1, wherein said binarization part comprises:
    an S/N ratio calculation part calculating an S/N ratio of said filtering result; and
    a threshold lower limit setting part setting a lower limit of said threshold based on said S/N ratio;
    wherein said S/N ratio calculation part counts the number of filter pass ranges having their range widths less than a specified value in said filtering result as the number of noise ranges, also counts the number of filter pass ranges having their range widths greater than or equal to the specified value in said filtering result as the number of signal ranges, and calculates said S/N ratio based on said number of signal ranges and said number of noise ranges.

3. The lane recognition image processing apparatus as set forth in claim 2, wherein said image sensing part comprises a CMOS image sensor.

4. The lane recognition image processing apparatus as set forth in claim 1, wherein said binarization part includes a multi-threshold setting part setting said threshold for each search scanning line of said one-dimensional image filtering part.

5. The lane recognition image processing apparatus as set forth in claim 1, wherein said window setting part includes a candidate point reference part setting, in the case of said candidate points being two or more, a window based on an intersection between a straight line connecting two points among said candidate points and the following search scanning line.

6. The lane recognition image processing apparatus as set forth in claim 1, wherein
    said at least one lane marking comprises a pair of right and left lane markings, and said apparatus further comprises a vanishing point learning part obtaining a vanishing point learning position based on said right and left lane markings;
    said vanishing point learning part approximates sets of candidate points extracted by said candidate point extraction part by straight lines, and obtains said vanishing point learning position from an intersection between approximate straight lines of said right and left lane markings; and
    said window setting part includes a vanishing point reference part that sets said window on the basis of an intersection between a straight line connecting one of said candidate points and said vanishing point learning position and the following search scanning line.

* * * * *